(12) United States Patent
Pal et al.

(10) Patent No.: US 8,714,737 B2
(45) Date of Patent: May 6, 2014

(54) COATED PRINT MEDIA

(75) Inventors: Lokendra Pal, San Diego, CA (US); Xulong Fu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 13/047,184

(22) Filed: Mar. 14, 2011

(65) Prior Publication Data

US 2012/0236095 A1 Sep. 20, 2012

(51) Int. Cl.
*B41J 2/01* (2006.01)

(52) U.S. Cl.
USPC .............. 347/105; 347/101; 428/32.1

(58) Field of Classification Search
USPC ............ 347/105, 101, 95, 96, 100, 20, 21; 428/195, 32.1; 106/31.6, 31.27, 31.13; 523/160, 161
See application file for complete search history.

(56) References Cited

U.S. PATENT DOCUMENTS

| | | |
|---|---|---|
| 5,643,984 A | 7/1997 | Mueller et al. |
| 6,242,082 B1 | 6/2001 | Mukoyoshi et al. |
| 6,245,422 B1 | 6/2001 | Onishi et al. |
| 6,586,516 B1 * | 7/2003 | Kesselmayer et al. ........ 428/463 |
| 6,779,884 B1 * | 8/2004 | Ma et al. .......................... 347/96 |
| 7,037,398 B2 | 5/2006 | Kwasny et al. |
| 7,078,102 B2 * | 7/2006 | Robertson .................. 428/424.2 |
| 7,585,553 B2 | 9/2009 | Burch et al. |
| 2003/0072925 A1 | 4/2003 | Kiyama et al. |
| 2004/0234709 A1 * | 11/2004 | Ishida et al. ............... 428/32.34 |
| 2008/0268186 A1 * | 10/2008 | Burch et al. ............... 428/32.33 |
| 2009/0317549 A1 * | 12/2009 | Tan et al. ................... 106/31.13 |

\* cited by examiner

*Primary Examiner* — Manish S Shah

(57) ABSTRACT

The present disclosure is drawn to a coated print medium, a method of preparing a print medium, and a printing system. The coated print medium includes a substrate and a coating applied to the substrate at coat weight from 1 gsm to 6 gsm. The coating include, by solids, 20 wt % to 90 wt % of non-film forming polymer particulates having a particle size from 50 nm to 300 nm and a glass transition temperature greater than 85.degree. C.; 1 wt % to 25 wt % water soluble polymer binder; 0.1 wt % to 5 wt % fixing agent; and 0.1 wt % to 10 wt % slip aid.

16 Claims, No Drawings

COATED PRINT MEDIA

BACKGROUND

There are several reasons that inkjet printing has become a popular way of recording images on various media surfaces, particularly paper. Some of these reasons include low printer noise, variable content recording, capability of high speed recording, and multi-color recording. Additionally, these advantages can be obtained at a relatively low price to consumers. However, though there has been great improvement in inkjet printing, accompanying this improvement are increased demands by consumers in this area, e.g., higher speeds, higher resolution, full color image formation, increased stability, etc. Additionally, inkjet printing technology is becoming more prevalent in high speed commercial printing markets, competing with more laborious offset and gravure printing technologies. Coated media typically used for these more conventional types of printing, e.g., offset or gravure printing, can perform somewhat acceptable on high speed inkjet printing devices, but there is still room for improvement as it relates to image quality, gloss, abrasion resistance, and other similar properties.

DETAILED DESCRIPTION

Before the present disclosure is described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the content clearly dictates otherwise.

"Substrate" or "media substrate" includes any base material that can be coated in accordance with examples of the present disclosure, such as film base substrates, polymer substrates, conventional paper substrates, photobase substrates, offset media substrates, and the like. Further, pre-coated and film coated substrates can be considered a "substrate" that can be further coated in accordance with examples of the present disclosure.

The term "non-film forming" when referring to "polymer particulates" herein does not mean that the polymer particulates cannot form a film at any temperature and pressure, but rather, they do not form a film at temperatures and pressures typically used in calendaring or otherwise heating/drying the coated media of the present disclosure. Stated another way and for clarity, non-film forming polymers are defined as having a glass transition temperature of 85° C. or greater. Typically, these non-film forming polymer particulates have an average particle size ranging from 50 nm to 300 nm, though this range is not intended to be limiting.

"Water soluble polymer binder" includes any hydrophilic or hydrophilic/hydrophobic blend of polymer material that can be used to bind particulates together to form a coating in accordance with examples of the present disclosure.

"Crosslinkers" are referred to herein as materials that have crosslinking properties specifically with respect to the water soluble polymer binders of a given coating composition.

The term "fixing agent" refers to salts that can be included in the coatings of the present disclosure, and which will interact with colorants when printed on the coated media described herein, e.g., crash with pigments, become fixed with dyes, etc.

"Slip aid" refers to materials that can be added to coating compositions herein to provide abrasion resistance to coatings of the present disclosure.

When referring to "high speed" as it related to a digital printing press, presses such as the HP T200 Web Press or the HP T300 Web Press exhibit printing speeds that are commensurate of what is considered to be "high speed." For example, the HP T300 Web Press can print on media at a rate of 400 feet per minute. This capability would be considered high speed. In another example, and more generally, printing at 100 feet per minute would also be considered high speed.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

With these definitions in mind, the present disclosure is drawn to a print medium, comprising a substrate and a coating applied to the substrate. The coating can comprise, by solids, 20 wt % to 90 wt % of non-film forming polymer particulates having a particle size from 50 nm to 300 nm and a glass transition temperature greater than 85° C., e.g., from 85° C. to 170° C.; 1 wt % to 25 wt % water soluble polymer binder; 0.1 wt % to 5 wt % fixing agent; and 0.1 wt % to 10 wt % slip aid.

In another example, a method of preparing a print medium can comprise applying a 0.5 gsm to 10 gsm coating to a substrate, and calendering the coating on the substrate. The coating can comprise, by solids, 20 wt % to 90 wt % of non-film forming polymer particulates having a particle size from 50 nm to 300 nm and a glass transition temperature greater than 85° C., e.g., from 85° C. to 170° C.; 1 wt % to 25 wt % water soluble polymer binder; 0.1 wt % to 5 wt % fixing agent; and 0.1 wt % to 10 wt % slip aid. The step of calendering the coating on the substrate can be carried out at a temperature from 35° C. to 60° C. and at a pressure from 500 psi to 1500 psi resulting in the coating having smoothness less than 3 microns and a surface gloss greater than 60% measured at 75°. In one particular example, the resultant surface gloss can be greater than 70%.

In another example, a printing system can comprise a high speed, inkjet digital press, and a print medium and an inkjet ink to load in the high speed, inkjet digital press. The print medium can comprise, by solids, 20 wt % to 90 wt % of non-film forming polymer particulates having a particle size from 50 nm to 300 nm and a glass transition temperature greater than 85° C., e.g., from 85° C. to 170° C.; 1 wt % to 25 wt % water soluble polymer binder; 0.1 wt % to 5 wt % fixing agent; and 0.1 wt % to 10 wt % slip aid. The inkjet ink can be formulated to interact with the fixing agent upon printing the inkjet ink on the print medium, e.g., inkjet ink can include a pigment colorant that crashes with the fixing agent or a dye colorant that becomes fixed or even attached to the fixing agent.

In these examples, it is noted that when discussing the coated print medium, the method of making the same, or the printing systems herein, each of these discussions can be considered applicable to each of these examples, whether or not they are explicitly discussed in the context of that example. Thus, for example, in discussing details about the coated print medium per se, such discussion also refers to the methods described herein, and vice versa.

That being stated, in the above examples, a print medium, a method of preparing a print medium, and a printing system can each include a substrate and a coating applied to the substrate. As mentioned, the substrate is typically a base or foundational material or coated medium, e.g., in the form of a sheet, roll, etc., that is coated in accordance with examples of the present disclosure. The substrate can be, without limitation, a polymer substrate, a conventional paper substrate, a photobase substrate, an offset coated media substrate, or the like. As mentioned, in one aspect of the present disclosure, the coatings herein can be applied to substrates that are already pre-coated with another material, such as offset coated media. To illustrate, the substrate can be a raw, pre-coated base having an offset coating applied at from 5 gsm to 40 gsm. Exemplary offset or other coatings that can be present on offset media include media with clay carbonate coatings, precipitated calcium carbonate coatings, calcined clay coatings, silica pigment-based coatings, combinations thereof, or the like.

As a point of clarification, it is noted that certain coatings (or pre-coatings) described herein may already be present as part of a substrates, and these coatings are not the same as formulation coatings primarily discussed in the context of the present disclosure. Offset media or photobase, for example, already include coatings on one or both side of a substrate material (and thus are considered to be part of the "substrate"). The coating formulations of the present disclosure, conversely, are those which are overcoated with respect to the pre-applied coatings, or alternatively, to substrates that are not already pre-coated. Such coatings, i.e. the pre-coating and/or the coating formulation of the present disclosure, can be present on either one side of a media substrate or both.

Turning now more specifically to the coating formulations of the present disclosure, as mentioned, such coatings include non-film forming polymer particulates, water soluble polymer binder, fixing agent, and slip agent. With specific reference to the non-film forming polymer particulates, these particulates include those which are non-film forming at typical calendering temperatures defined herein, and typically have a glass transition temperature of 85° C. or greater, e.g., from 85° C. to 170° C. Examples of commercial material that meets these criteria include synthetic polymers such as Raycryl® 30S (acrylic emulsion polymer, solids 41 wt %, pH 7.3, zeta potential −58.0 mV, particle size 100 nm, and glass transition temperature 130° C.), Joncryl ECO 2189 (styrene acrylic polymer, solids 48 wt %, pH 8.2, zeta potential −47.2 mV, particle size 100 nm, and glass transition temperature 98° C.), and Raycat® 78 (polyacrylic emulsion polymer, solids 40 wt %, pH 5.5, zeta potential +34.1 mV, particle size 240 nm, and glass transition temperature 114° C.). These exemplary non-film forming polymer particulates are examples of suitable materials that can be used herein, but it is noted that other materials currently available or available in the future that meet the criteria described herein can also be used.

The use of non-film forming polymer particulates has several advantages in preparing inkjet recording mediums for high speed digital press printing. To illustrate, conventionally coated glossy media for conventional printing (offset/gravure) does not tend to perform adequately on high speed inkjet Web Press devices, such as the T300 HP Web Press or the T200 HP Web Press, because during high speed printing, these types of media do not have enough capacity in the media to absorb high water content of inkjet inks. This adversely affects image quality of the print because of the negative characteristics of bleed, coalescence, ink smearing, etc. Also, glossy offset coated media printed with inkjet inks are often less durable, and perform especially poor with respect to dry and wet smudge resistance. By using the non-film forming polymer particulates described herein, high gloss can be obtained while at the same time providing a highly absorptive media with low bleed and smudge characteristics.

In another aspect of the present disclosure, the media coatings described herein benefit from the inclusion of a water soluble polymer binder. Though ink absorption and bleed control can be achieved without the addition of binder, it has been discovered that the binder controls dusting and aids in the cohesiveness and durability of the media coating. For example, by inclusion of even a small amount of water soluble polymer binder, the coated media retains its acceptable print characteristics, and the coated media has a cleaner look that does not have an undesired powder film that can result when a binder is not present.

The water soluble polymer binder can be any hydrophilic or hydrophilic/hydrophobic blend of polymer material that can be used to bind particulates together in accordance with examples of the present disclosure. By "water soluble," it is noted that the polymer binder is typically at least partially water soluble, mostly water soluble (at least 50%), or in some examples, completely water soluble (at least 99%) in the coating composition. Polyvinyl alcohols, starches, and proteins are examples of acceptable water soluble polymer binders that can be used.

Optionally, and in combination with the water soluble polymer binder, a crosslinker or crosslinking agent can also be included in the coating formulations of the present disclosure. Crosslinkers include materials that have crosslinking properties specifically with respect to the water soluble polymer binder used in a given coating composition. Suitable crosslinkers include boric acid, ammonium zirconium carbonate (AZC), potassium zirconum carbonate (KZC), and OCHCHO (glyoxal). More specifically, in some examples, boric acid is an acceptable crosslinker for polyvinyl alcohol, and in other examples, AZC, KZC, and glyoxal are acceptable crosslinkers for proteins and starches. In one example, non-acidic crosslinkers, such as a blocked glyoxal-based insolubilizer (e.g., CURESAN® 200) can be used to crosslink the water soluble binder, and these are particularly useful when the anionic non-film forming polymer particulates are also being used.

Crosslinkers are usually present at relatively small concentrations in the coating composition, e.g., from 0.01 wt % to 5 wt % of the formulation, and in many instances, the crosslinkers are more typically present at a ratio of 1:100 to 1:4 crosslinker to binder by weight, though these concentrations and ratios are not intended to be limiting.

Turning now to the fixing agent, various types of fixing agents can be used in the media coatings of the present disclosure. Often, the fixing agent can be a salt, such as calcium chloride, magnesium chloride, calcium bromide, magnesium bromide, calcium nitrate, magnesium nitrate, or aluminum chlorohydrate. These salts act as a crashing agent for pigment-based inkjet inks in particular. To illustrate one fixing agent, aluminum chlorohydrate (ACH), can be considered for use. ACH is a polymeric cationic hydroxyl inorganic aluminum complex often formed by the hydrolysis of chloride-containing aluminum salts. As mentioned, the fixing agent is included so as to crash with pigmented inks when printed on the coated media described herein. Because the fixing agent is used in combination of the non-film forming polymer particulates described herein, a lower concentration of fixing agent may be included than would otherwise be used, while still providing good bleed control, e.g., from 0.1 wt % to 5 wt % fixing agent. In other words, it is believed that a relatively low concentration of fixing agent in the coating formulations of the present disclosure, in combination with the non-film forming polymer particulates, work together to provide bleed control more so than either ingredient at a similar concentration would be expected to provide alone.

Other additives can also be present such as slip aids that contribute to abrasion resistance and coefficient of friction (COF) reduction. High density polyethylene type waxes are suitable slip aids. Commercially available slip aids that can be used include Michemshield® 29235 and Ultralube® E846, for example.

Additionally, there are many other additives that can be included without departing from the scope of the present disclosure. For example, optical brighteners can be included in the coating formulations of the present disclosure at concentrations ranging from 0.01 wt % to 5 wt %. Examples of such optical brighteners include tetrasulfonated stilbene compounds commercially available under the trade name Tinopal ABP-A, as well as colorants or dyes such as those sold under the trade name IRGALITE® Blue Dye. Lubricants, thickeners, biocides, defoamers, buffering agents, CMS, and surfactants can also be added in minor amounts as well, e.g., from 0.01 wt % to 5 wt %. Fillers can also be included in minor amounts, e.g., from 0.01 wt % to 5 wt %, including materials such as clays, ground calcium carbonate, precipitated calcium carbonate, barium sulfate, titanium dioxide, silica, aluminum trihydrate, aluminum oxide, boehmite, and combinations thereof. Again, these materials are optional and considered fillers, and if added, should not detract from the functional characteristics of the coating formulation as a whole.

Once the formulation is prepared, the coating can be applied to the substrate by any of a number of coating methods. In accordance with examples of the present disclosure, the substrate can be coated by spray coating, dip coating, cascade coating, roll coating, gravure coating, curtain coating, air knife coating, cast coating, Mayer rod coating, blade coating, film coating, metered size press coating, puddle size press coating, calender stack, and/or by using other known coating techniques. The thickness selected for each coated layer can depend upon the particular desired property or application. However, an advantage of the formulations of the present disclosure is that they can be applied relatively thinly compared to many other commercially available coating compositions. To illustrate, in one example, the coating can be applied at a coat weight from 0.5 gsm to 10 gsm. In another example, the coating can be applied to the substrate at a coat weight from 1 gsm to 6 gsm. More typical coat weights for comparative media that does not include the components of the present disclosure are usually in the order of about 15 gsm or greater, so a thinner coating with high gloss, acceptable bleed control, and smudge resistance can be particularly advantageous.

Once the coating has been applied to the substrate, the coating can be calendered using heat and pressure to provide a finished appearance that is comparable to the look and feel of offset glossy coated media. However, though the look and feel of the coated media is similar to offset glossy media, the properties remain very different, e.g., the media can accept much more water, will crash (with pigment-based ink) or otherwise attach/fix (dye-based ink) with inkjet inks to improve bleed control, and will be more durable with respect dry and wet smudge than similar images printed on offset print media.

In one example, the coating can be calendered on the substrate at a temperature from 35° C. to 50° C. at a pressure from 500 psi to 1500 psi, resulting in the coating having smoothness less than 3 microns per TAPPI Test Method T555, and a surface gloss greater than 60% measured at 75° per TAPPI Test Method T480. In another example, the coating can be evaluated for its gloss potential by calendering on the substrate specifically at 1000 psi and 46° C., and then measuring the gloss at 75°. Under these conditions, the gloss will often be 60% or greater, or even 70% or greater. Though calendering is a good way to provide a coating with acceptable characteristics for high speed, digital press printers such as the T300 HP Web Press or the T200 HP Web Press, calendering is not necessarily required. Calendering merely provides an additional optional step that may or may not be desirable under certain conditions.

EXAMPLES

The following examples illustrate some of the coated media substrates, systems, and methods that are presently known. However, it is to be understood that the following are only exemplary or illustrative of the application of the principles of the present compositions, systems, and methods. Numerous modifications and alternative compositions, systems, and methods may be devised by those skilled in the art without departing from the spirit and scope of the present disclosure. The appended claims are intended to cover such modifications and arrangements. Thus, while the examples have been described above with particularity, the following provide further detail in connection with what are presently deemed to be the acceptable examples.

Example 1

Several coating formulations were prepared in accordance with Table 1 below (expressed in parts by weight):

TABLE 1

| | Coating Formulations | | | | | | |
|---|---|---|---|---|---|---|---|
| | Formulation | | | | | | |
| | 1 | 2 | 3 | 4 | 5 | 6 | 7 |
| Cationic non-film forming polymer (Raycat ® 78) | | | 100 | 100 | 100 | 100 | 100 |

TABLE 1-continued

Coating Formulations

|  | Formulation | | | | | | |
|---|---|---|---|---|---|---|---|
|  | 1 | 2 | 3 | 4 | 5 | 6 | 7 |
| Anionic non-film forming polymer particulates (Raycryl ® 30S) | 100 | 100 | | | | | |
| Water Soluble Polymer Binder (PVA) | 5 | 5 | | 5 | 5 | | 5 |
| Fixing Agent (CaCl₂) | 5 | 5 | 5 | 5 | 5 | | |
| Fixing Agent (ACH) | | | | | | 3 | 3 |
| Crosslinker (Boric Acid) | | | | | 0.5 | | |
| Crosslinker (Curesan 200) | | 0.5 | | | | | |
| Slip Aid (Michemshield ® 29235) | 1 | 1 | 1 | 1 | 1 | 1 | 1 |
| Optical Brightener | 0.5 | 0.5 | 0.5 | 0.5 | 0.5 | 0.5 | 0.5 |
| Blue Dye | 0.005 | 0.005 | 0.005 | 0.005 | 0.005 | 0.005 | 0.005 |
| Total Dry Parts | 111.505 | 112.005 | 106.505 | 111.505 | 112.005 | 104.505 | 109.505 |
| Solids wt % | 20.99 | 20.92 | 35.61 | 36.00 | 36.00 | 35.43 | 38.16 |
| pH | 7.45 | 7.22 | 4.55 | 5.55 | 4.94 | 4.60 | 4.30 |

These coating formulations can be prepared using various preparative methods and various orders of ingredient addition. Additionally, in circumstances where undesirable gelling occurs, the total solids content can be adjusted downward to reduce the tendency for gelling. Undesirable gelling is more likely to occur if significant amount of salt is added with anionic non-film forming polymer particulates, such as Raycryl® 30s, than with cationic non-film forming polymer particulates, such as Raycat® 78. To illustrate, in one example, the order of addition of ingredients can be water, non-film forming polymer particulates, fixing agent, crosslinker, water soluble polymer binder, slip aid, and other additives. However, with Raycryl® 30s, the order may be modified so that the fixing agent is added after the crosslinker and the water soluble polymer binder. Also, non-acidic crosslinkers, such as CURESAN® 200, can be used for crosslinking the water soluble binders in anionic non-film forming polymer coating systems to avoid incompatibility.

Example 2

The coating formulations of Table 1 were overcoated on an offset print media. The offset print media was pre-coated with a 60/40/11 (parts by weight) blend of precipitated calcium carbonate/calcined clay/latex. To this pre-coated offset print media was coated the formulations of Table 1 using drawdowns with a Mayer rod. Once the coatings were in place, calendering was conducted at 1000 psi and 46° C. for all of the samples.

After preparing the coated print media, it was determined that Formulations 3 and 6 were less desirable for use due to dusting found on the respective coated media substrates, as well as a general lack of adhesion between particles. Thus, it is believed that the water soluble polymer binder (PVA in these examples) in the other formulations contributed to acceptable dusting control, and coating layer adhesion to the substrate as well as non-film forming polymer interparticle adhesion.

Example 3

Coated media sheets prepared using Formulations 1, 4, 5, and 7 were inkjet printed in full color (including black) using an HP CM8060 Color MFP® printer with pigment ink commercially available for use with the HP T300 High Speed Inkjet Web Press. The print modes selected were Direct Drive, 2 Pass, and 6 Dry Spins. The purpose of this study was to determine whether coated and calendered media sheets of the present disclosure provided high gloss and acceptable durability and bleed control compared to more traditional coatings including silica based coating (which typically provide acceptable image quality but matte appearance), or clay/carbonate/salt based coatings (which typically provide acceptable bleed control but poor durability and matte appearance). Table 2 below provides the results of this study.

TABLE 2

|  | Formulation | | | | | | | |
|---|---|---|---|---|---|---|---|---|
|  | 1 | | 4 | | 5 | | 7 | |
| Coat Weight (gsm) | 1 | 3 | 3 | 6 | 6 | 1 | 3 | 6 |
| Surface Smoothness (μm) | 1.70 | 1.59 | 1.65 | 1.29 | 1.72 | 1.85 | 1.80 | 1.56 |
| Unimaged Gloss at 75° (%) | 60.1 | 62.1 | 71.3 | 71.6 | 70.7 | 68.1 | 65.3 | 67.4 |
| Imaged (Black Color) Gloss at 75° (%) | 73.9 | 73.6 | 65.9 | 67.0 | 60.9 | 83.1 | 77.5 | 78.4 |

TABLE 2-continued

| | Formulation | | | | | | | |
|---|---|---|---|---|---|---|---|---|
| | 1 | | 4 | | 5 | | 7 | |
| Black Optical Density | 1.83 | 1.74 | 1.71 | 1.63 | 1.60 | 2.13 | 2.10 | 2.02 |
| Finger Smudge | Visual Relative | 5 | 4 | 5 | 5 | 5 | 5 | 5 | 5 |
| Wet Smudge | Ranking | 4 | 3 | 4 | 4 | 4 | 5 | 5 | 5 |
| Bleed | (5-best, 1-worst) | 4 | 4 | 2 | 3 | 4 | 5 | 4 | 3 |
| Dry-to-Touch | | 5 | 5 | 5 | 5 | 5 | 5 | 5 | 5 |

As can be seen from Table 2 above, the media sheets coated in accordance with the examples of the present disclosure exhibited high gloss, e.g., greater than 60% at a 75 degree angle, both before and after printing. Further, some of the samples exhibited even higher gloss (greater than 70%) either before printing or after printing, or both. The samples also exhibited acceptable surface smoothness, as well as acceptable image quality with black optical density greater than 1.6. Furthermore, finger smudge testing, wet smudge testing, dry-to-touch testing, and bleed control were all determined to be acceptable for most samples, with only bleed control for Formulation 3 being less than might be desirable.

It is noted that in Table 2 above, image gloss was determined at 75 degrees using a BYK Gardiner Gloss measurement device per TAPPI Test Method T480. Surface smoothness (roughness) was determined using a Parker Print Surf (PPS) tester per TAPPI Test Method T555. Black optical density (KOD) was measured using a transmission/reflection densitometer, X-rite 938 with DEN A settings. Finger smudge data was generated using visual rankings from 1 to 5, with 5 having the least smudging and 1 having the most smudging after finger rubbing the orange color print area immediately after printing. Wet smudge data was likewise collected using visual rankings from 1 to 5 (again with 5 being the best), and was determined by first air drying the printed samples at room temperature for 24 hours, followed by 50 micro-liters of water being poured on each printed colors (CMYK). After 30 second, the print area was smudged back and forth 5 times with 0.25 lbs weight using a cotton TexWipe (TX309) mounted on the top pad on a TMI ink rub tester. Bleed was determined by visual rankings from 1 to 5, with 5 having the least color-to-color bleed and 1 having the most color-to-color bleed. Dry to touch scores were determined by visual rankings from 1 to 5, with 5 having the least ink smearing and 1 having the most ink smearing after smearing the print area after 1 minute (approx.) with a neoprene (Safeskin® Hypoclean Critical™ Latex Gloves—HC1380S) glove tip secured by an o-ring on an earplug (Moldex Pura-Fit #6800) that was attached to a smeartron pen.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A coated print medium, comprising:
a substrate;
a coating applied to the substrate at a coat weight from 1 gsm to 6 gsm, comprising, by solids:
20 wt % to 90 wt % of non-film forming polymer particulates having a particle size from 50 nm to 300 nm and a glass transition temperature greater than 85° C.;
1 wt % to 25 wt % water soluble polymer binder;
0.1 wt % to 5 wt % fixing agent; and
0.1 wt % to 10 wt % slip aid.

2. The print medium of claim 1, wherein the substrate is uncoated or precoated and comprises a member selected from the group of a polymer substrate, a paper substrate, a photobase substrate, a film coated substrate, and an offset media substrate.

3. The print medium of claim 1, wherein the non-film forming polymer particulates include synthetic polyacrylic emulsion polymers, synthetic acrylic emulsion polymers, or synthetic styrene acrylic polymers.

4. The print medium of claim 1, wherein the non-film forming polymer particulates are anionic or cationic.

5. The print medium of claim 1, wherein the fixing agent is selected from the group of calcium chloride, magnesium chloride, calcium bromide, magnesium bromide, calcium nitrate, magnesium nitrate, aluminum chlorohydrate, and combinations thereof.

6. The print medium of claim 1, wherein the coating further comprises from 0.01 wt % to 5 wt % of a crosslinking agent, and wherein the crosslinking agent to water soluble polymer binder weight ratio is from 1:100 to 1:4.

7. The print medium of claim 1, wherein the coating has a gloss of at least 60% when calendered at 1000 psi and 46° C. and measured at a 75 degree angle.

8. The print medium of claim 1, wherein the coating is calendered on the substrate at a temperature from 35° C. to 50° C. and at a pressure from 500 psi to 1500 psi, resulting in the coating having smoothness less than 3 microns, and a surface gloss greater than 60% prior to printing thereon measured at a 75 degree angle.

9. The print medium of claim 8, wherein the surface gloss is greater than 70% prior to printing thereon measured at a 75 degree angle.

10. A method of preparing a print medium, comprising:
applying a 1 gsm to 6 gsm coating to a substrate, the coating comprising, by solids:
20 wt % to 90 wt % of non-film forming polymer particulates having a particle size from 50 nm to 300 nm and a glass transition temperature greater than 85° C.;
1 wt % to 25 wt % water soluble polymer binder;
0.1 wt % to 5 wt % fixing agent; and
0.1 wt % to 10 wt % slip aid; and
calendering the coating on the substrate at a temperature from 35° C. to 50° C. and at a pressure from 500 psi to 1500 psi, resulting in the coating having smoothness less than 3 microns, and a surface gloss greater than 60% prior to printing thereon measured at a 75 degree angle.

11. The method of claim 10, wherein the non-film forming polymer particulates are cationic or anionic, and wherein the fixing agent is selected from the group of calcium chloride, magnesium chloride, calcium bromide, magnesium bromide, calcium nitrate, magnesium nitrate, aluminum chlorohydrate, and combinations thereof.

12. The method of claim 10, wherein the coating is prepared by admixing the non-film forming polymer particulates, the water soluble polymer binder, and if present, a crosslinking agent prior to the addition of the fixing agent.

13. The method of claim 10, wherein the surface gloss is greater than 70% prior to printing thereon measured at a 75 degree angle.

14. A printing system, comprising:
a high speed, inkjet digital press;
a print medium to load in the high speed, inkjet digital press, said print medium comprising a substrate having a coating applied thereto in an amount of 1 gsm to 6 gsm, the coating comprising, by solids:
    20 wt % to 90 wt % of non-film forming polymer particulates having a particle size from 50 nm to 300 nm and a glass transition temperature greater than 85° C.;
    1 wt % to 25 wt % water soluble polymer binder;
    0.1 wt % to 5 wt % fixing agent; and
    0.1 wt % to 10 wt % slip aid; and
an inkjet ink to load or is pre-loaded in the digital press, wherein the inkjet ink includes a colorant to interact with the fixing agent upon printing the inkjet ink on the print medium.

15. The print system of claim 14, wherein the coating is calendered on the substrate at a temperature from 35° C. to 50° C. and at a pressure from 500 psi to 1500 psi, resulting in the coating having smoothness less than 3 microns, and a surface gloss greater than 60% prior to printing thereon measured at a 75 degree angle.

16. The printing system of claim 15, wherein the surface gloss is greater than 70% prior to printing thereon measured at a 75 degree angle.

* * * * *